US007537080B2

(12) United States Patent
Murakami et al.

(10) Patent No.: US 7,537,080 B2
(45) Date of Patent: May 26, 2009

(54) ELECTRIC POWER-STEERING APPARATUS

(75) Inventors: Tetsuya Murakami, Osaki (JP); Atsuya Miyata, Osaka (JP); Hiroshi Murataka, Koriyama (JP); Akihiro Hironaka, Koriyama (JP)

(73) Assignees: JTEKT Corporation, Osaka (JP); Gates Unitta Asia Company, Osaka (JP)

( * ) Notice: Subject to any disclaimer, the term of this patent is extended or adjusted under 35 U.S.C. 154(b) by 183 days.

(21) Appl. No.: 10/544,220

(22) PCT Filed: Feb. 3, 2004

(86) PCT No.: PCT/JP2004/001070

§ 371 (c)(1),
(2), (4) Date: Aug. 2, 2005

(87) PCT Pub. No.: WO2004/069631

PCT Pub. Date: Aug. 19, 2004

(65) Prior Publication Data

US 2006/0076181 A1   Apr. 13, 2006

(30) Foreign Application Priority Data

Feb. 3, 2003  (JP) .............................. 2003-026381

(51) Int. Cl.
*B62D 5/04* (2006.01)
(52) U.S. Cl. ...................................... 180/444; 474/148
(58) Field of Classification Search ................. 180/444; 74/388 PS; 474/148
See application file for complete search history.

(56) References Cited

U.S. PATENT DOCUMENTS

| 2,462,455 | A | * | 2/1949 | Bartlett ........................ 74/413 |
| 4,768,998 | A | * | 9/1988 | Hirose et al. ................ 474/152 |
| 4,837,692 | A | * | 6/1989 | Shimizu ....................... 701/41 |
| 6,244,125 | B1 | | 6/2001 | Sano |
| 6,868,936 | B2 | * | 3/2005 | Shimizu et al. ............. 180/444 |
| 7,189,176 | B2 | * | 3/2007 | Sakaida et al. .............. 474/148 |

FOREIGN PATENT DOCUMENTS

| DE | 115719 | 12/1900 |
| EP | 0079534 | 5/1983 |
| EP | 1 270 369 A2 | 1/2003 |
| GB | 2079892 | 1/1982 |
| JP | 58-47592 | 10/1983 |
| JP | 59-20053 | 5/1984 |
| JP | 59-22102 | 5/1984 |

(Continued)

*Primary Examiner*—Tony H. Winner
(74) *Attorney, Agent, or Firm*—Rabin & Berdo, PC

(57) ABSTRACT

An electric power steering apparatus includes a reduction gear mechanism (17) for reducing the rotation speed of an output shaft (16) of an electric motor (15). The reduction gear mechanism (17) comprises an inscribed gear (39) rotatable interlockingly with the output shaft (16), and a circumscribed gear (40) in which the inscribed gear (39) is inscribed. An endless belt connects a driving pulley (41) integrally rotatable with the circumscribed gear (40) and a driven pulley (42) disposed so as to surround a steerable shaft. By heightening the reduction gear ratio by the speed reduction using the inscribed gear (39) and the circumscribed gear (40), the reduction gear mechanism (17) as a whole can achieve a high reduction gear ratio without making the diameter of the driving pulley (41) very small.

8 Claims, 6 Drawing Sheets

FOREIGN PATENT DOCUMENTS

| | | |
|---|---|---|
| JP | 54-164829 | 8/1985 |
| JP | 3-34381 | 7/1991 |
| JP | 4-28583 | 5/1992 |
| JP | 8-21499 | 1/1996 |
| JP | 2000-46136 | 2/2000 |
| WO | WO 01/15956 A2 | 3/2001 |

* cited by examiner

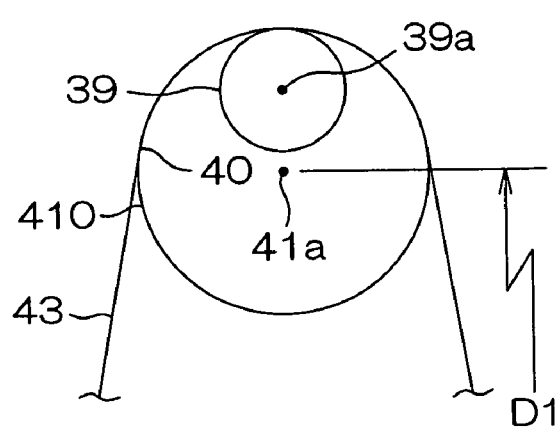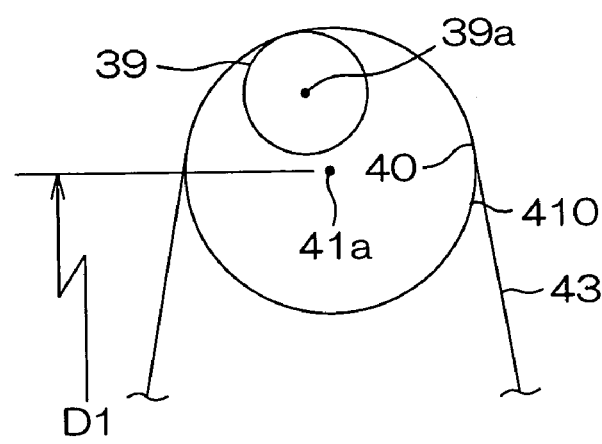

ELECTRIC POWER-STEERING APPARATUS

TECHNICAL FIELD

The present invention relates to an electric power steering apparatus in which steering assist force is generated by an electric motor.

BACKGROUND ART

In a rack assist type electric power steering apparatus, the rotation of an electric motor is slowed down by a reduction gear mechanism comprising a pulley-belt mechanism and thereafter converted into the axial movement of a rack shaft, for example, through a ball screw mechanism surrounding the rack shaft (see, for example, Japanese Examined Patent Publication No. 4(1992)-28583).

The abovementioned pulley-belt mechanism comprises a small pulley disposed on the same axis line with an output shaft of the electric motor, and a large pulley surrounding the rack shaft.

A reduction gear mechanism of such a kind of electric power steering apparatus is required to be small-sized and at the same time to obtain a high reduction gear ratio.

However, if the small pulley is made small-diameter for this purpose, the radius of curvature of a belt region wound on the small pulley becomes small and it is feared that the life of belt is shortened because of its flexion fatigue. Besides, it is feared that torque transmission loss is caused by increased inner friction at curved portions of the belt.

On the contrary, if the large pulley is made large-diameter, the whole apparatus becomes large thus to lessen its mountability on a vehicle.

Therefore, an object of the present invention is to provide an electric power steering apparatus which is small-sized and suitably mountable on a vehicle, and can achieve a high reduction gear ratio and high durability.

DISCLOSURE OF INVENTION

For the purpose of solving the abovementioned problem, an electric power steering apparatus according to a mode of the present invention comprises an electric motor for generating steering assist force, a reduction gear mechanism for reducing a rotation speed of an output shaft of the electric motor, and a conversion mechanism for converting the output rotation of the reduction gear mechanism into an axial movement of a steerable shaft extending in a transverse direction of the vehicle, and the reduction mechanism comprises an inscribed gear having external teeth and being rotatable interlockingly with the output shaft of the electric motor, a circumscribed gear having internal teeth in which the inscribed gear is inscribed, a driving pulley integrally rotatable with the circumscribed gear, a driven pulley disposed so as to surround the steerable shaft, and an endless belt for connecting the driving pulley and the driven pulley.

According to this embodiment, the rotation speed of the output shaft of the electric motor is reduced by the inscribed gear and the circumscribed gear, and thereafter it is reduced by the ratio between the diameters of the driving pulley and the driven pulley. Since the speed reduction using the inscribed gear and the circumscribed gear can heighten the reduction gear ratio, a high reduction gear ratio can be achieved with a small-sized reduction gear mechanism as a whole without a small-diameter driving pulley or a large-diameter driven pulley, thus to obtain a good mountability on a vehicle. Further, since it is not necessary to reduce the radius of curvature of the region of the driving pulley on which the belt is wound, the life of the belt can be extended.

BRIEF DESCRIPTION OF DRAWINGS

FIGS. 6A and 6B are pattern diagrams of a reduction gear mechanism, in which the load increases from FIG. 6A to FIG. 6B.

BEST MODE FOR CARRYING OUT THE INVENTION

Preferred embodiments of the present invention will be described below with reference to the appended drawings.

Figure 1:
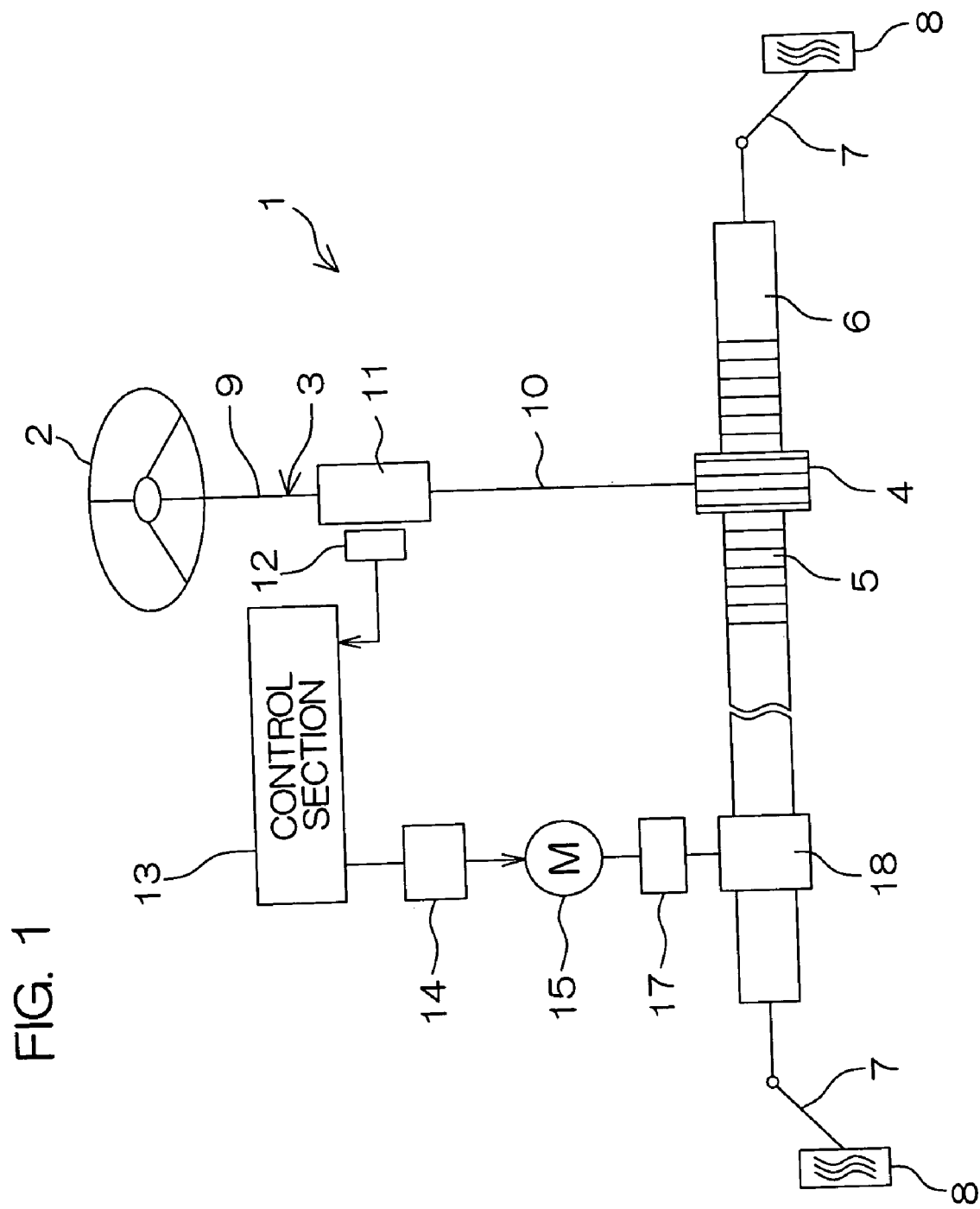
FIG. 1 is a pattern diagram of the schematic structure of an electric power steering apparatus according to an embodiment of the present invention.

FIG. 1 is a pattern diagram of the schematic structure of an electric power steering apparatus according to an embodiment of the present invention. Referring to FIG. 1, the electric power steering apparatus (EPS) 1 comprises a steering shaft 3 connected to a steering wheel 2 as a steering member at an end of the steering shaft 3, a pinion 4 provided at the other end of the steering shaft 3, and a rack shaft 6 as a steerable shaft having rack teeth 5 engageable with the pinion 4 and extending in the direction of the width (transverse direction) of a vehicle.

Connected respectively to both ends of the rack shaft 6 are tie rods 7, each of which is connected through a corresponding knuckle arm (not shown) to a corresponding wheel 8. When the steering wheel 2 is operated to rotate the steering shaft 3, this rotation of the steering shaft 3 is converted through the pinion 4 and the rack teeth 5 into linear movement of the rack shaft 6 in the lateral direction of the vehicle. Thereby, the rotational steering of the wheels can be achieved.

The steering shaft 3 is divided into an input shaft 9 connected to the steering wheel 2 and an output shaft 10 connected to the pinion 4. The input shaft 9 and the output shaft 10 are connected to each other through a torsion bar 11 on the same axial line.

A torque sensor 12 is provided for detecting the steering torque on the basis of the relative rotational displacement amount between the input and output shafts 9, 10 connected through the torsion bar 11. The steering torque data detected by the torque sensor 12 are given to a control section 13. In the control section 13, electric current to be applied to a steering assist electric motor 15 is controlled through a driver 14 on the basis of the detected torque data, detected vehicle speed data or the like. The rotation speed of an output shaft 16 (see FIG. 2) of the electric motor 15 is reduced by a reduction gear mechanism 17 comprising a pulley-belt mechanism. The output rotation of the reduction gear mechanism 17 is converted through a conversion mechanism 18 into the axial movement of the rack shaft 6 thereby to assist the steering. The electric power steering apparatus 1 is a so-called rack assist type one.

Figure 2:
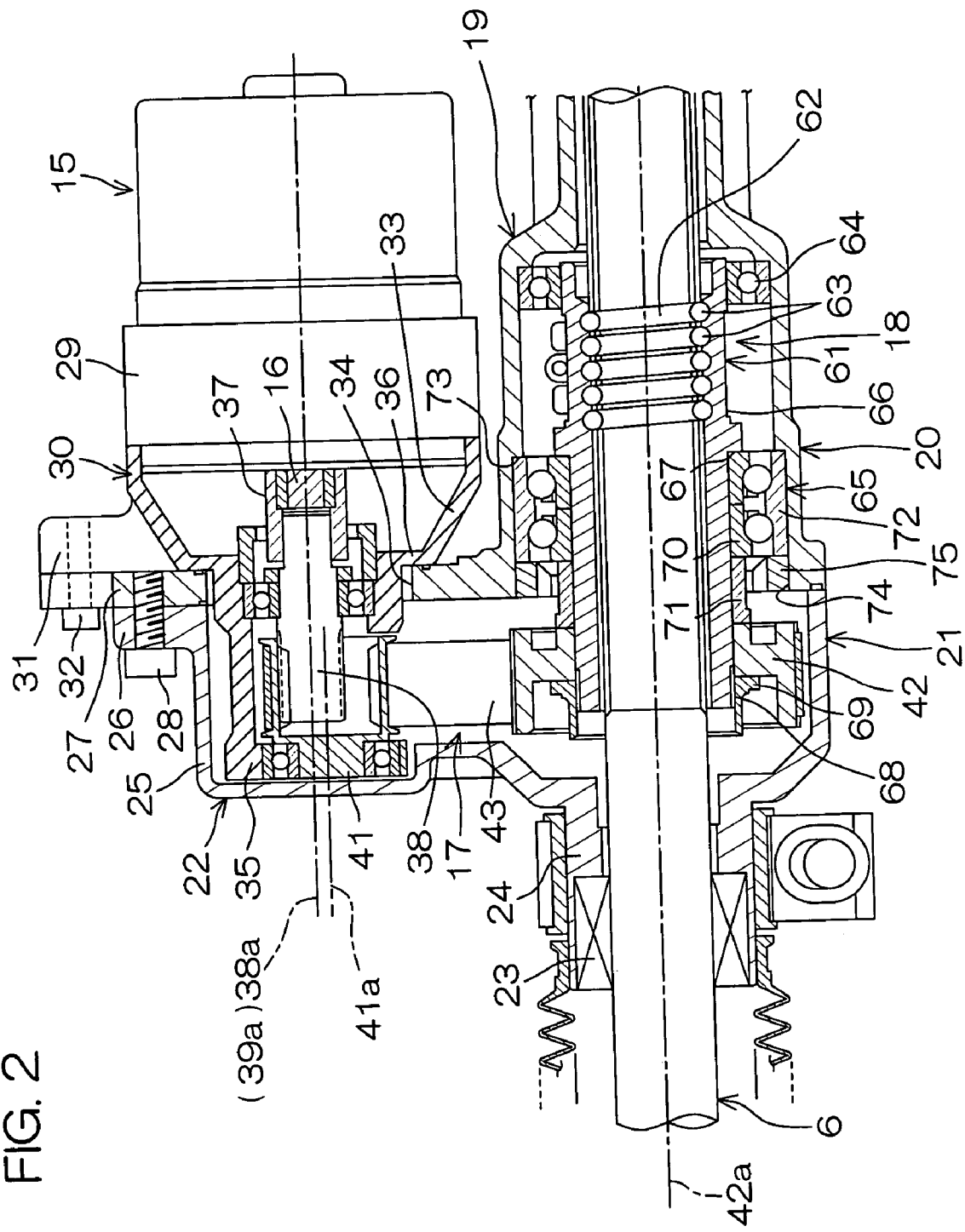
FIG. 2 is sectional view of the main part of an electric power steering apparatus.
Figure 3:
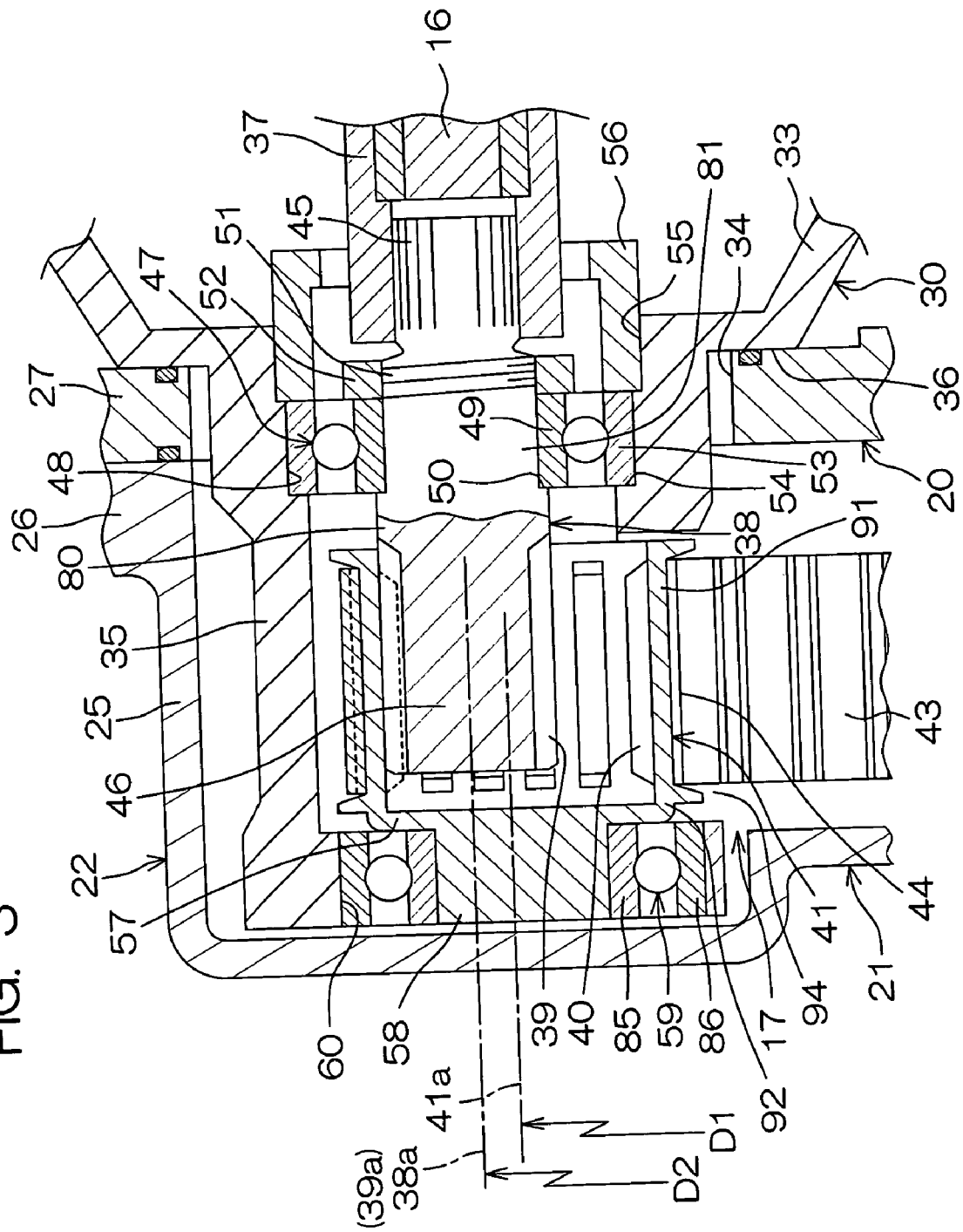
FIG. 3 is an enlarged sectional view of the main part of FIG. 2.

FIG. 2 is an enlarged sectional view of the main part of the electric power steering apparatus 1 and FIG. 3 is an enlarged sectional view of the main part of FIG. 2.

Referring to FIGS. 2 and 3, a rack housing 19 comprises a cylindrical main housing 20 and an end portion housing 21 connected to each other. A reduction gear housing 22 is integrally provided at the connecting portion between the main housing 20 and the end portion housing 21.

In concrete terms, the end portion housing 21 comprises a small-diameter part 24 holding a rack bush 23 slidably supporting the rack shaft 6, and a large-diameter part 25 forming the reduction gear housing 22. A flange 26 provided at the end of the large-diameter part 25 and a side plate 27 standing from the main housing 20 abut each other and are connected to each other by a connection screw 28.

The electric motor 15 is juxtaposed with the rack housing 19 so that the output shaft 16 of the electric motor 15 is in parallel with the rack shaft 6. A cylindrical connection housing 30 is integrally provided with a motor housing 29 of the electric motor 15. An attachment flange 31 of the connection housing 30 and the side plate 27 of the main housing 20 abut each other and are connected to each other by a connection screw 32.

The connection housing 30 comprises a taper part 33 connected to the motor housing 29, a cylindrical part 35 inserted through a connection opening 34 of the side plate 27 into the reduction gear housing 22, and an annular step part 36 disposed between the taper part 33 and the cylindrical part 35. By abutting the annular step part 36 against the side plate 27, the motor housing 29 is positioned in the axial direction with respect to the reduction gear housing 22 through the connection housing 30.

Referring mainly to FIG. 3, the reduction gear mechanism 17 comprises an input shaft 38 connected to the output shaft 16 of the electric motor 15 in the same axial line, for example, through a joint 37 using serration, an inscribed gear 39 formed on the circumferential surface of the input shaft 38, a circumscribed gear 40 in which the inscribed gear is inscribed, a driving pulley 41 provided on the outer circumference of the circumscribed gear 40, a driven pulley 42 (see FIG. 2) disposed so as to surround the rack shaft 6, and a belt 43 as an endless belt wound between the driving pulley 41 and the driven pulley 42.

The distance between the central axis line 39a of the inscribed gear 39 (namely, the central axis line 38a of the input shaft 38) and the central axis line 42a of the driven pulley 42, namely, the center to center distance D2 between the inscribed gear 39 and the driven pulley 42, is larger than the distance between the central axis line 41a of the driving pulley 41 and the central axis line 42a of the driven pulley 42, namely, the center to center distance D1 between the driving pulley 41 and the driven pulley 42.

Figure 4:
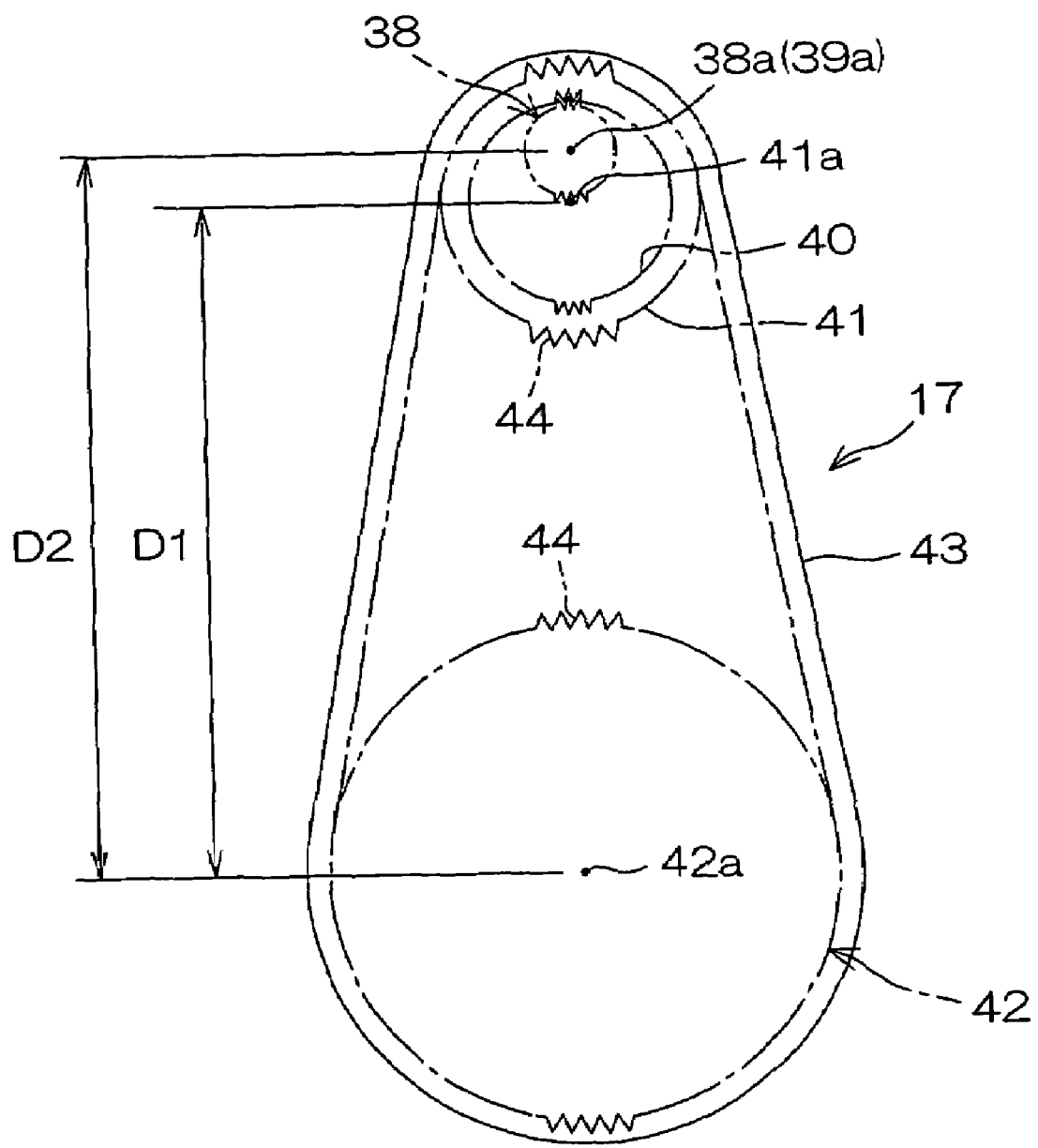
FIG. 4 is a pattern diagram of a reduction gear mechanism.

As shown in FIG. 4, for example, the belt 43 comprises a toothed belt (cogged belt), and the driving pulley 41 comprises a toothed pulley on the outer circumference of which teeth 44 are provided with equal spaces therebetween on the circumference so as to be engageable with the toothed belt. Similarly, the driven pulley 42 comprises a toothed pulley.

Referring to FIG. 3 again, the input shaft 38 includes a first end portion 45, a second end portion 46 and an intermediate portion 80 between the first and second end portions 45, 46. The first end portion 45 of the input shaft 38 having, for example, a serration, is inserted into the joint 37, and connected through the joint 37 to the output shaft 16 of the electric motor 15 so as to be rotatable integrally with the output shaft 16. Further, in the intermediate portion 80 of the input shaft 38, a portion 81 close to the first end portion 45 is rotatably supported by a first bearing 47 held by a first support hole 48 of the cylindrical part 35 of the connection housing 30.

An inner ring 49 of the first bearing 47 is held between a positioning step part 50 of the input shaft 38 and a check nut 52 screwed into a screw part 51 so that the axial movement of the inner ring 49 with respect to the input shaft 38 is restricted. An outer ring 53 of the first bearing 47 is held between a positioning step part 54 of the first support hole 48 and a cylindrical setscrew 56 screwed into a screw part 55 of the first support hole 48 so that the axial movement of the outer ring 53 is restricted.

On the outer circumference of the input shaft 38, the inscribed gear 39 is integrally formed from the second end portion 46 to the midway portion of the intermediate portion 80 thus to be engaged with the circumscribed gear 40 formed on the inner circumference of the cylindrical driving pulley 41.

The driving pulley 41 has a shape of a bottomed cylinder and comprises a first end portion 91 and a second end portion 92. The first end portion 91 of the driving pulley 41 is opened and the second end portion 92 is closed by an end face plate 57. A support shaft 58 is formed so as to extend along the central axis line 41a of the driving pulley 41 from the end face plate 57 of the driving pulley 41. A second bearing 59 is held by a second support hole 60 in the cylindrical part 35 of the connection housing 30. The second bearing 59 is a support means for supporting the driving pulley 41 in a cantilever manner and rotatably about the central axis line 41a through the support shaft 58. Further, since the driving pulley 41 is supported also by the abovementioned input shaft 38, it is supported at both ends and its operation is stable.

The support shaft 58 is fitted into an inner ring 85 of the second bearing 59 so as to be integrally rotatable with the inner ring 85 of the second bearing 59. Further, since the end face plate 57 of the driving pulley 41 is in contact with the end face of the inner ring 85, the axial movement of the driving pulley 41 is restricted. An outer ring 86 of the second bearing 59 is press fitted into the abovementiond second support hole 60.

The cylindrical part 35 of the connection housing 30 contains the inscribed gear 39, the subscribed gear 40 and the driving pulley 41. Further, the cylindrical part 35 has an opening 94 for passing the belt 43 therethrough. The first end portion 91 of the driving pulley 41 is opposed to the edge of the opening 94 with a small distance therebetween, so that excessive inclination of the driving pulley 41 is restricted.

Referring to FIG. 2 again, as the conversion mechanism 18, for example, a ball screw mechanism or a bearing screw mechanism (see, e.g. Japanese Unexamined Patent Publication No. 2000-46136) is used for converting the rotational movement into the linear movement. In this embodiment, an example of using a ball screw mechanism is described. The conversion mechanism 18 includes a ball nut 61 as a rotational member surrounding the circumference of the rack shaft 6.

The ball nut 61 is threadedly engaged with a ball screw thread 62 formed in the midway portion of the rack shaft 6 through balls 63 thus to constitute the conversion mechanism 18. The ball nut 62 is rotatably supported by the rack housing 19 through a third bearing 64 and a fourth bearing 65.

Further, the abovementioned driven pulley 42 is put on the outer circumferential part 66 of the ball nut 61 so as to integrally rotate with the outer circumferential part 66 of the ball nut 61. In concrete terms, since an inner ring 70 of a fourth bearing 65, an annular spacer 71 and the driven pulley 42 are integrally held between a positioning step part 67 formed on the outer circumferential part 66 of the ball nut 61 and a check nut 69 threaded into a screw portion 68 of the outer circumferential part 66, the driven pulley 42 is attached to the ball nut 61 so as to integrally rotate therewith. Besides, the inner ring 70 of the fourth bearing 65 and the driven pulley 42 are restricted from moving in the axial direction with respect to the ball nut 61.

Since an outer ring 72 of the fourth bearing 65 is held between a positioning step part 73 of the main housing 20 of the rack housing 19 and a setscrew 75 threaded into a screw portion 74 of the main housing 20, the outer ring 72 is fixed to the main housing 20. Thereby, the fourth bearing 65 restricts the axial movement of the ball nut 61 and the driven pulley 42. The fourth bearing 65 comprises, for example, a doublerow angular contact ball bearing.

According to this embodiment, the rotation speed of the output shaft 16 of the electric motor 15 is reduced by the inscribed gear 39 and the circumscribed gear 40, and thereafter further reduced by the ratio between the diameters of the driving pulley 41 and the driven pulley 42. Since the speed reduction using the inscribed gear 39 and the circumscribed gear 40 can heighten the reduction gear ratio, a high reduction gear ratio can be achieved with the small-sized reduction gear mechanism 17 as a whole without decreasing the diameter of the driving pulley 41 or increasing the diameter of the driven pulley 42, thus to obtain a good mountability on a vehicle. Further, since it is not necessary to reduce the radius of curvature of the region of the driving pulley 41 on which the belt 43 is wound, the life of the belt 43 can be extended.

Further, since the reduction gear housing 22 supports the driving pulley 41 through the second bearing 59 so as to rotate about its central axis line 41a, the driving pulley 41 can be stably supported.

Figure 5:
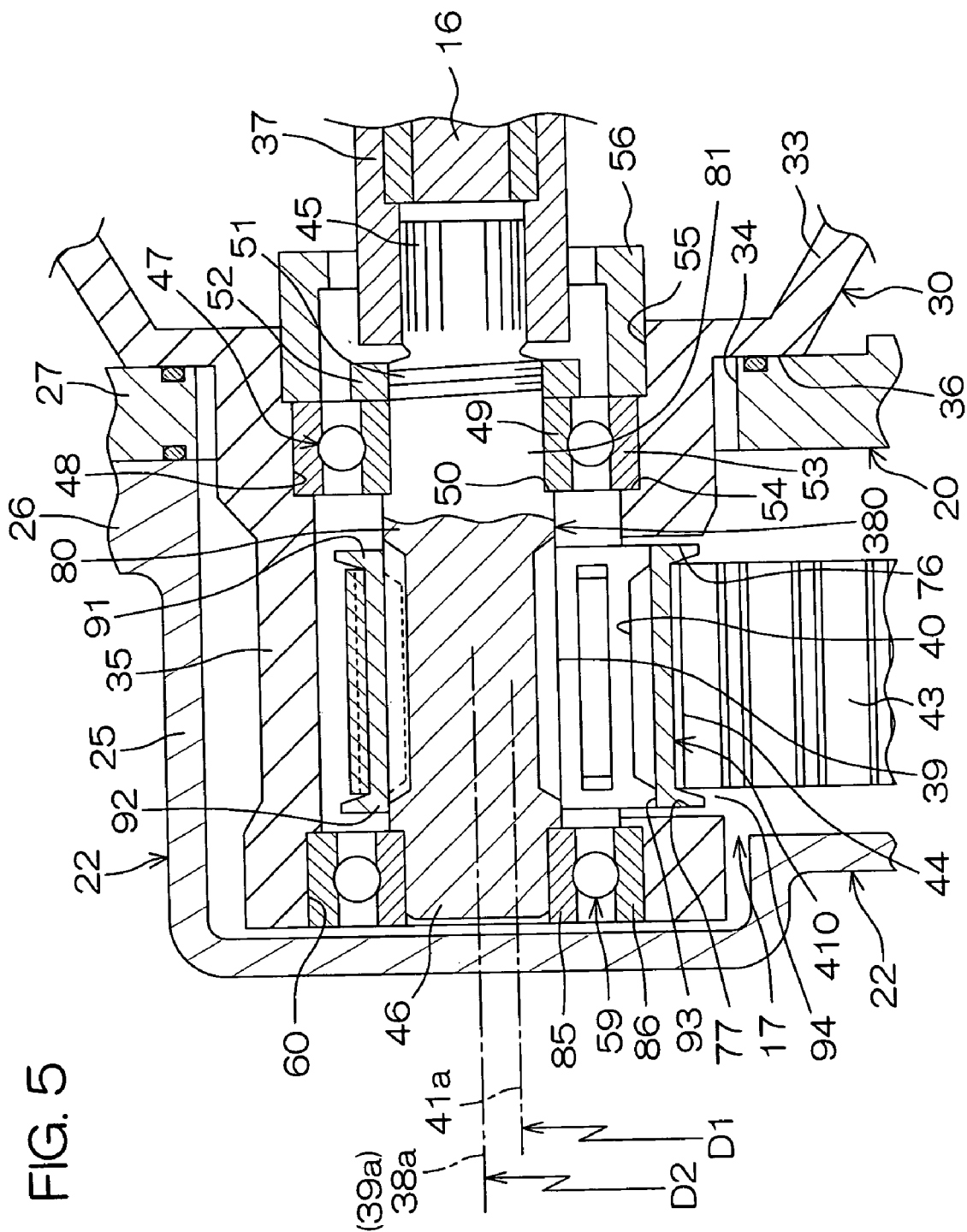
FIG. 5 is an enlarged sectional view of the main part of an electric power steering apparatus according to another embodiment of the present invention.

FIG. 5 illustrates another embodiment of the present invention. Referring to FIG. 5, this embodiment differs from the embodiment of FIG. 3 mainly in the following point. That is, in the embodiment of FIG. 3, the driving pulley 41 is supported rotatably about its central axis line 41a, while in this embodiment, the driving pulley 41 0 is swingably supported by the inscribed gear 39 of an input shaft 380. In FIG. 5, similar parts to those of FIG. 3 are designated with the same reference characters and description thereof will be omitted.

The driving pulley 410 has a through hole 93 opened at a first end portion 91 and a second end portion 92. The input shaft 380 comprising a penetrating shaft penetrates through the through hole 93 of the driving pulley 410. The second end portion 46 of the input shaft 380 is rotatably supported through the second bearing 59 by the second support hole 60 in the cylindrical part 35 of the connection housing 30.

The cylindrical part 35 of the connection housing 30 has an opening 94 for passing the belt 43 therethrough. At the edge portions of this opening 94, a pair of guide parts 76, 77 are formed so as to be opposed to the first and second end portions 91, 92, the driving pulley 410, respectively. By the pair of guide parts 76, 77, the axial movement and rotational rocking of the driving pulley 410 are restricted and at the same time the rotation of the driving pulley 41 is guided. Thereby, the rotational rocking of the driving pulley 410 can be prevented, so that torque transmission loss can be reduced.

On the other hand, since the center to center distance D1 between the driving pulley 410 and the driven pulley 42 is smaller than the center to center distance D2 between the inscribed gear 39 and the driven pulley 42 (D1<D2), and besides, the driving pulley 410 is swingably supported by the inscribed gear 39, the following effects and advantages can be obtained.

That is, when the load of the reduction gear mechanism 17 increases as shown in FIG. 6B from the transmission state shown in FIG. 6A, the swing amount of the driving pulley 410 increases and the center to center distance D1 between the driving pulley 410 and the driven pulley 42 becomes large, so that the tension of the belt progressively increases. As a result, a large output can be transmitted. In such a way, the tension of the belt can be made to be of a load-sensitive type and therefore the initial tension (tension in the unloaded state) of the belt is restricted to be low, so that the life of the belt can be extended.

Further, in the present invention, a flat belt or a chain belt can be used instead of a toothed belt.

Furthermore, an inscribed gear formed separately from the input shaft may be attached to the outer circumference of the input shaft. A circumscribed gear formed separately from the driving pulley may be attached to the inner circumference of the driving pulley.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

The invention claimed is:

1. An electric power steering apparatus, comprising:
    an electric motor for generating a steering assist force;
    a reduction gear mechanism for reducing a rotation speed of an output shaft of the electric motor;
    a conversion mechanism for converting an output rotation of the reduction gear mechanism into an axial movement of a steerable shaft extending in a transverse direction of a vehicle,
    the reduction mechanism comprising:
        an inscribed gear having external teeth and being rotatable interlockingly with the output shaft of the electric motor;
        a circumscribed gear having internal teeth in which the inscribed gear is inscribed;
        a driving pulley integrally rotatable with the circumscribed gear, the driving pulley being in the shape of a cylinder and having a first end portion and a second end portion, the first end portion of the driving pulley being closer to the output shaft of the electric motor than the second end portion, and at least the first end portion of the driving pulley being opened,
        a driven pulley disposed so as to surround the steerable shaft;
        an endless belt for connecting the driving pulley and the driven pulley, and
        an input shaft for transmitting a driving force through the inscribed gear and the circumscribed gear to the driving pulley;
    a housing for containing the inscribed gear, the circumscribed gear and the driving pulley, and
    a driving pulley support means held by the housing for supporting the driving pulley in a cantilever manner and rotatably about a central axis line of the driving pulley, wherein
    a support shaft is formed as extending from the second end portion of the driving pulley along the central axis line of the driving pulley, and
    the driving pulley support means comprises a bearing for rotatably supporting the driving pulley through the support shaft.

2. The electric power steering apparatus according to claim 1, in which the inscribed gear is provided on a circumference of a part of the input shaft.

3. The electric power steering apparatus according to claim 2, in which the input shaft comprises a shaft formed as one piece integrally with the inscribed gear.

4. The electric power steering apparatus according to claim 1, in which the driving pulley comprises a pulley formed as one piece integrally with the circumscribed gear.

5. The electric power steering apparatus according to claim 1, in which
 the input shaft comprises a first end portion, a second end portion and an intermediate portion,
 the first end portion of the input shaft being connected to the output shaft of the electric motor on a same axis line so as to transmit torque thereto,
 the inscribed gear being provided on an outer circumference of at least the second end portion of the input shaft, and
 the intermediate potion of the input shaft comprising a portion rotatably supported by a bearing held by the housing.

6. An electric power steering apparatus according to claim 1, in which a center to center distance between the driving pulley and the driven pulley is shorter than a center to center distance between the inscribed gear and the driven pulley.

7. The electric power steering apparatus according to claim 1, wherein
 the housing containing the driving pulley comprises a connection housing integrally formed with a housing of the electric motor and attached to a housing of the reduction gear mechanism, the connection housing having a cylindrical part, and
 the cylindrical part of the connection housing being inserted into the housing of the reduction gear mechanism.

8. The electric power steering apparatus according to claim 1, in which the endless belt comprises a toothed belt, and the driving pulley and the driven pulley comprise toothed pulleys.

* * * * *